Patented Feb. 23, 1926.

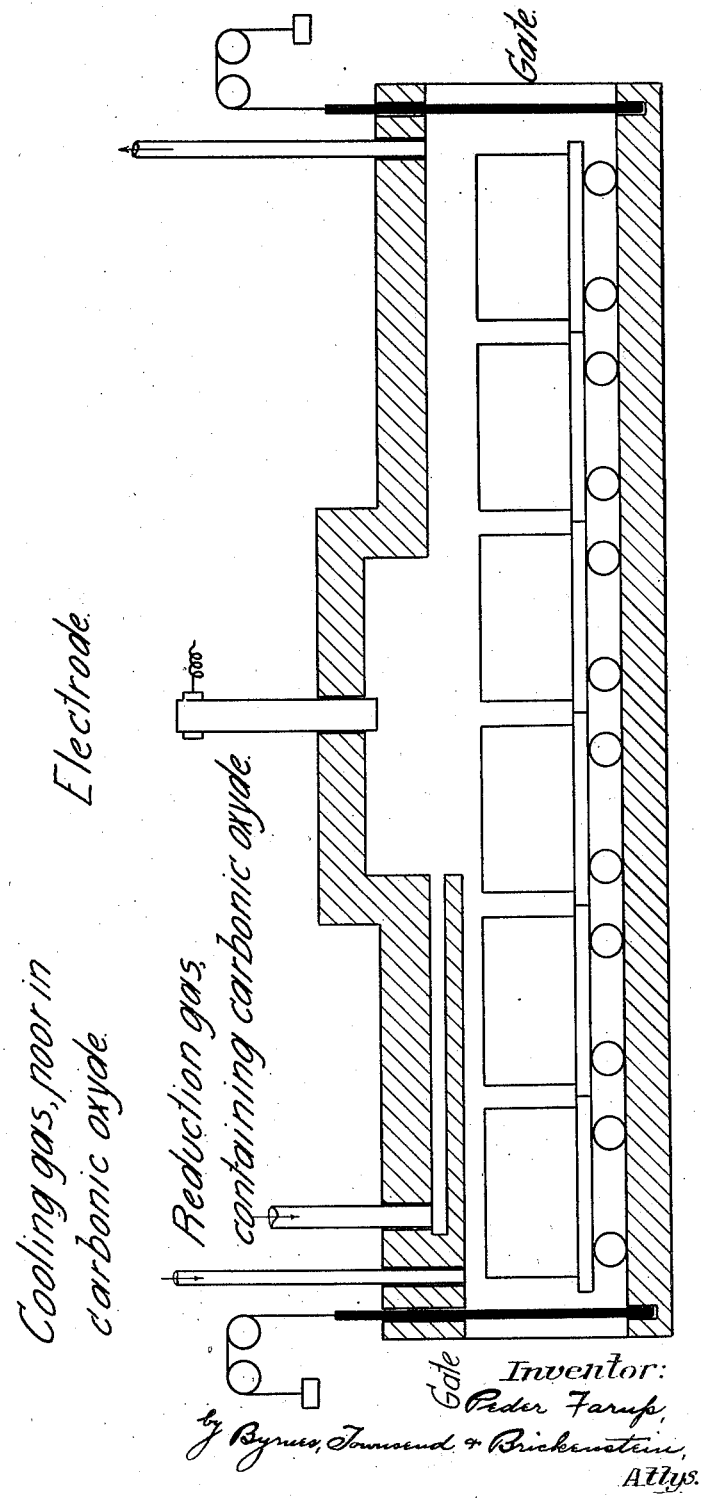

1,574,382

UNITED STATES PATENT OFFICE.

PEDER FARUP, OF SLEMDAL, NEAR CHRISTIANIA, NORWAY, ASSIGNOR TO NORSK HYDRO-ELEKTRISK KVAELSTOFAKTIESELSKAB, OF CHRISTIANIA, NORWAY.

PROCESS FOR THE DRY REDUCTION OF IRON ORE.

Application filed May 10, 1922. Serial No. 559,870.

*To all whom it may concern:*

Be it known that I, PEDER FARUP, Professor Dr., a citizen of the Kingdom of Norway, residing at Slemdal, near Christiania, Norway, have invented certain new and useful Improvements in Processes for the Dry Reduction of Iron Ore, of which the following is a specification.

As it is well known the dry reduction of iron ore is effected by moving the ore, sometimes together with solid reducing substances, through a heated zone through which reducing gases simultaneously flow.

Now it often happens that the iron which is taken out of the furnace falls to pieces and partly turns into dust.

This is a drawback which only occurs when carbonic oxide is used for the reduction, but as carbonic oxide, from a thermical point of view, is the best gas to use, it is nearly always employed for reduction purposes either alone or mixed with other gases. This disadvantage can therefore hardly be done away with by avoiding the use of carbonic oxide.

The inventor has therefore thoroughly studied the progress of this method and he has discovered that the above mentioned drawback may be avoided if care is taken that there is not any considerable quantity of carbonic oxide present while the reduced iron is cooling. This can be effected by decreasing the pressure so as to eliminate the gases which are detrimental to the quality of the iron. A better method, however, from a technical point of view is to cool the iron in a gas which does not contain a considerable quantity of carbonic oxide. Even when this precaution has been taken the iron has sometimes fallen to pieces when cooling. Further investigations have proved that this only takes place in cases where there has been a superfluous quantity of carbon. This carbon has probably while cooling reacted further with carbonic di-oxide, ferro-oxide or other compositions of oxygen. In order to ensure a good result it is necessary to take care that there is no more solid carbon left when the reduction is at an end than that which the process demands.

It has been proved that the cooling gases do not need to be quite free of carbonic oxide. Lighting gas, for instance, has given good results. Otherwise either hydrogen or nitrogen or the like may be used.

The invention can be carried out in various ways.

In the case of discontinuous operations, the reducing gas can be shut out and the indifferent cooling gas can be conducted into the furnace where it can expel the reducing gas. Another way is to place the material after the reduction has taken place into a special cooling furnace, through which the cooling gas flows. This method is mostly suited for rotary furnaces or other furnaces in which the solid substance moves. The apparatus is more simple when only one furnace is used. In order to obtain continuous operation in one furnace a third method may be used, in that the solid substances are allowed to move forward in the furnace and the cooling gas is introduced at that end where the iron leaves the furnace. Consequently the gas containing carbonic oxide is brought into the reduction zone as a means of reduction.

In this case but a small quantity of the cooling gas is needed and it will not be able to absorb the amount of heat in the product.

In order to do away with this drawback the cooling zone of the furnace can be provided with an arrangement by means of which the heat can be transferred to the reducing gas from the reduced material. This can be achieved by placing pipes or canals in the furnace room or the wall, eventually in the shape of a double arch. The reducing gas is introduced through these canals or the double arch and on account of the high speed the gases can absorb the heat from the product which is passing out.

As an example of this method the drawing shows a canal furnace where the ore is transported in wagons from right to left. The heating is effected by means of a light arc between two electrodes and the reduction is effected by means of a gas containing carbonic oxide. The cooling gas which contains little carbonic oxide, for instance, lighting gas, is introduced on the left hand side of the furnace. When the lighting gas enters the reduction zone it will mix with the reaction gas and assist in the reduction.

Instead of canal furnaces other kinds of furnaces may be used in which the reduction matter moves, for instance, shaft furnaces.

I claim:

1. In the dry process of reducing iron ore by means of carbonic oxide, the step which consists in cooling the reduced mass in an atmosphere containing only a relatively small proportion of carbonic oxide.

2. In the dry process of reducing iron ore, the steps which consist in subjecting the ore to treatment with a reducing gas containing carbonic oxide and then replacing the reducing gas with a cooling gas containing only a relatively small proportion of carbonic oxide.

3. In the dry process of reducing iron ore, the steps which consist in reducing in one zone of a furnace with a gas containing carbonic oxide and cooling the reduced material in another zone in an atmosphere containing only a relatively small proportion of carbonic oxide.

4. In the dry process of reducing iron ore by means of carbonic oxide, the step which consists in removing the reduced material to a cooling chamber having an atmosphere containing only a relatively small proportion of carbonic oxide.

5. In the dry process of reducing iron ore, the steps which consist in reducing in one zone of a furnace with a gas containing carbonic oxide, cooling the reduced material in another zone in an atmosphere containing only a relatively small proportion of carbonic oxide, and preheating the reducing gas by the transfer thereto of heat abstracted from the cooling zone.

In testimony whereof I affix my signature.

PEDER FARUP.